(12) United States Patent
Shimada

(10) Patent No.: US 6,361,685 B1
(45) Date of Patent: Mar. 26, 2002

(54) METHOD AND APPARATUS FOR FERMENTATION OF ORGANIC WASTE MATERIAL

(75) Inventor: Takahisa Shimada, Matsue (JP)

(73) Assignee: Kabushiki Kaisha Dai-Ichi Consultant, Shimane-ken (JP)

( * ) Notice: Subject to any disclaimer, the term of this patent is extended or adjusted under 35 U.S.C. 154(b) by 0 days.

(21) Appl. No.: 09/617,679

(22) Filed: Jul. 14, 2000

(30) Foreign Application Priority Data

Dec. 20, 1999 (JP) .................................. 11-360845

(51) Int. Cl.$^7$ .................................................. C02F 3/30
(52) U.S. Cl. .................... 210/177; 210/205; 210/221.2; 435/290.2
(58) Field of Search ................................ 210/612, 613, 210/620, 629, 630, 175, 177, 178, 179, 205, 216, 217, 220, 221.2; 71/8–10, 11, 14, 21, 22; 435/290.2–290.4, 298.1, 298.2

(56) References Cited

U.S. PATENT DOCUMENTS

| | | | |
|---|---|---|---|
| 3,246,953 A | * | 4/1966 | Redman et al. |
| 3,547,612 A | * | 12/1970 | Westelaken et al. |
| 3,966,415 A | * | 6/1976 | Chester |
| 4,146,381 A | * | 3/1979 | Willisch et al. |
| 4,246,099 A | * | 1/1981 | Gould et al. |
| 4,255,389 A | * | 3/1981 | Jung et al. |
| 4,272,489 A | * | 6/1981 | Lutz et al. |
| 4,451,372 A | * | 5/1984 | Rovira |
| 5,049,486 A | * | 9/1991 | Blackwood et al. |
| 5,766,876 A | * | 6/1998 | Santiago et al. |
| 5,853,450 A | * | 12/1998 | Burnham et al. |
| 5,942,022 A | * | 8/1999 | Bislev et al. |
| 5,972,058 A | * | 10/1999 | Torkkeli |
| 6,024,513 A | * | 2/2000 | Hodgins et al. |
| 6,059,972 A | * | 5/2000 | Mahrer |

* cited by examiner

Primary Examiner—David A. Simmons
Assistant Examiner—Fred Prince
(74) Attorney, Agent, or Firm—Rader, Fishman & Grauer, PLLC

(57) ABSTRACT

The present invention relates to a method and an apparatus for fermentation of cattle dung or like organic waste material containing high percentage of water. In a method of accommodating a treating object material consisting of an organic waste material containing a predetermined quantity of water in a fermentor for fermentation, a method of the present invention comprises the step of granulating the treating object material in a nodular-shape before being accommodated in the fermentor for fermentation with the supply of warm air in starting of fermentation through manually communicating ventilation spaces formed between the surfaces of the adjacent granules of the treating object material. The percentage of water content in the treating object material before being granulated is controlled until a percentage of water content enough to permit granulation and aerobic fermentation is reached. In a mechanism having a fermentation chamber for fermenting a treating object material consisting of an organic waste material accommodated in a fermentor, and a warm air supply chamber provided at a lower part of the fermentation chamber through a ventilation floor ensuring well-ventilation, an apparatus of the present invention is characterized by providing a dispersing device on the inside of the warm air supply chamber for supplying warm air toward the bottom of the fermentation chamber in a uniformly dispersed state.

1 Claim, 4 Drawing Sheets

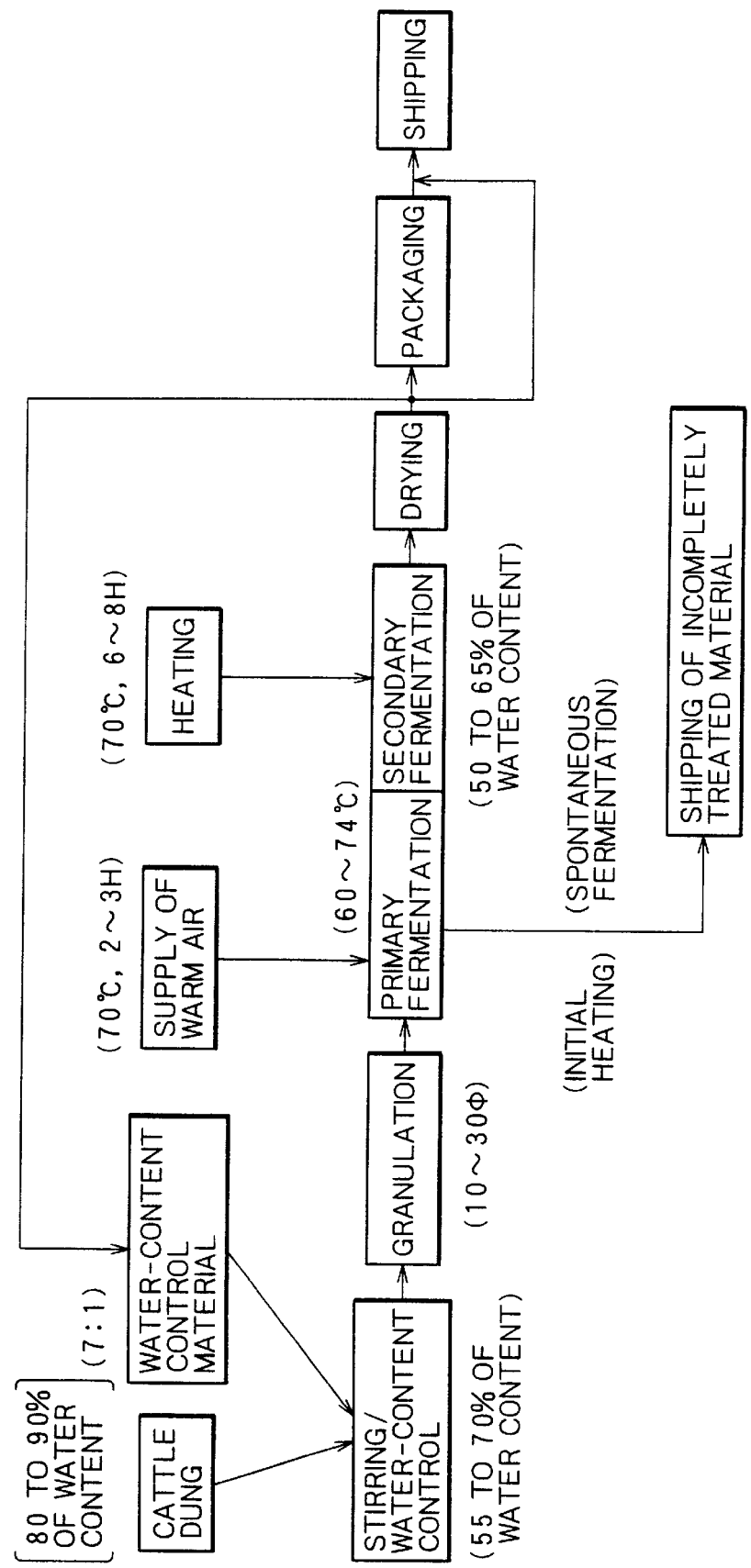

METHOD AND APPARATUS FOR FERMENTATION OF ORGANIC WASTE MATERIAL

BACKGROUND OF THE INVENTION

1. Field of the Invention

This invention relates to a method and an apparatus for fermentation of cattle dung, sewage sludge, pulverized kitchen garbage or like sludgy or nearly sludgy organic waste material mainly containing high percentage of water.

2. Description of the Prior Art

Conventionally, a method for fermenting the above organic waste material for effective applications to a solid organic fertilizer and a soil amendment material or the like has been widely known, as disclosed in Japanese Patent Publication No. 59-18353, for instance.

For fermentation of the organic waste material, a treating object material is dehydrated or mixed with dried straws, husks or like vegetable fiber materials containing low percentage of water for control of the water content of the treating object material until a predetermined or less ercentage of water content (in the range of 60 to 65% generally) enough to permit aerobic fermentation is reached. Then, the material subjected to control of the water content is fed into a fermentor for aerobic fermentation through the supply of warm air or the like till the initial starting stage of fermentation.

However, the limit of the percentage of water content controlled according to the method and the apparatus in the prior art is 65% at most, while the ideal percentage of water content is considered to be not more than 60%. For that reason, disadvantages in the prior art are that the treating object material needs to be hydrated or to be mixed with a large quantity of water-content control material, and much time is required for such hydrating or mixing works and fermentation decomposition.

Since an apparatus for aerobic fermentation (primary fermentation) in the prior art only permits primary fermentation, it is necessary for anaerobic fermentation (secondary fermentation) following the primary fermentation to install an apparatus for secondary fermentation of a primarily fermented material taken out from the fermentor used for primary fermentation. There is also a need for a material cutting work in the course of secondary fermentation and also a fermentation facility having a floor of a size enough to perform the cutting work. Thus, the apparatus for fermentation in the prior art is not economical from the points of installation cost and management of fermentation.

The present invention is to provide a method and an apparatus for fermentation of an organic waste material for eliminating the above problems in the prior art.

SUMMARY OF THE INVENTION

It is a primary object of the present invention to reduce substantially a time for fermentation of an organic waste material containing high percentage of water into a fertilizer, while permitting less space, less labor and less installation cost for fermentation by applying a single apparatus to both primary fermentation as aerobic fermentation and secondary fermentation as anaerobic fermentation.

Another object of the present invention is to offer a substantially improved allowable range of a percentage of water content in a treating object material, in addition to easy low-cost maintenance and management of an installation, without the need for a cutting work or the like having been required for primary fermentation and secondary fermentation.

A further object of the present invention is to permit a substantial reduction in time from the start of initial heating of a treating object material till the attainment of the peak temperature of fermentation, together with a stockyard saving and a prevention of offensive odor by deodorizing the treating object material through the process of attaining the peak temperature of fermentation to facilitate the following process of carrying back the fermented material to a farm and so on.

A method according to the present invention for achieving the above objects has the following features.

In a method of accommodating a treating object material consisting of an organic waste material containing a predetermined quantity of water in a fermentor for fermentation, the first feature of the method is that the treating object material is granulated in a nodular-shape before being accommodated in the fermentor for fermentation of the treating object material through mutually communicating ventilation spaces formed respectively between the surfaces of the adjacent granules of the treating object material.

The second feature is that the percentage of water content in the treating object material before being granulated is controlled until a percentage of water content enough to permit granulation and primary fermentation as aerobic fermentation is reached.

The third feature is that warm air is supplied to the treating object material accommodated in the fermentor until at least the treating object material is heated up to a temperature enough to keep up with primary fermentation as aerobic fermentation under an object temperature.

The fourth feature is that the treating object material having finished the primary fermentation is subjected to secondary fermentation as anaerobic fermentation in the same fermentor as that for the primary fermentation.

In a mechanism having a fermentation chamber for fermenting a treating object material consisting of an organic waste material accommodated in a fermentor and a warm air supply chamber provided at a lower part of the fermentation chamber through a ventilation floor ensuring well ventilation, the first feature of an apparatus according to the present invention is that a dispersing device for supplying warm air in a uniformly dispersed state toward the bottom of the fermentation chamber is provided on the inside of the warm air supply chamber.

The second feature of the apparatus is that the dispersing device is structured that a large number of pipes having well-ventilated outer walls are installed in or inserted into the air supply chamber in grating-shaped or panel-shaped combination, and warm air is supplied to the pipes.

BRIEF DESCRIPTION OF THE DRAWINGS

The foregoing and other objects and features of the invention will become apparent from the following description of an embodiment of the invention with reference to the accompanying drawings, in which:

FIG. 1 is a view showing the process of a method according to the present invention;

DETAILED DESCRIPTION OF THE PREFERRED EMBODIMENT

FIG. 1 shows the process for treatment of cow dung, and FIGS. 2 and 3 show an apparatus for water-content control and granulation of a treating object material and an apparatus for fermentation thereof for use in the above process respectively.

Figure 2A:
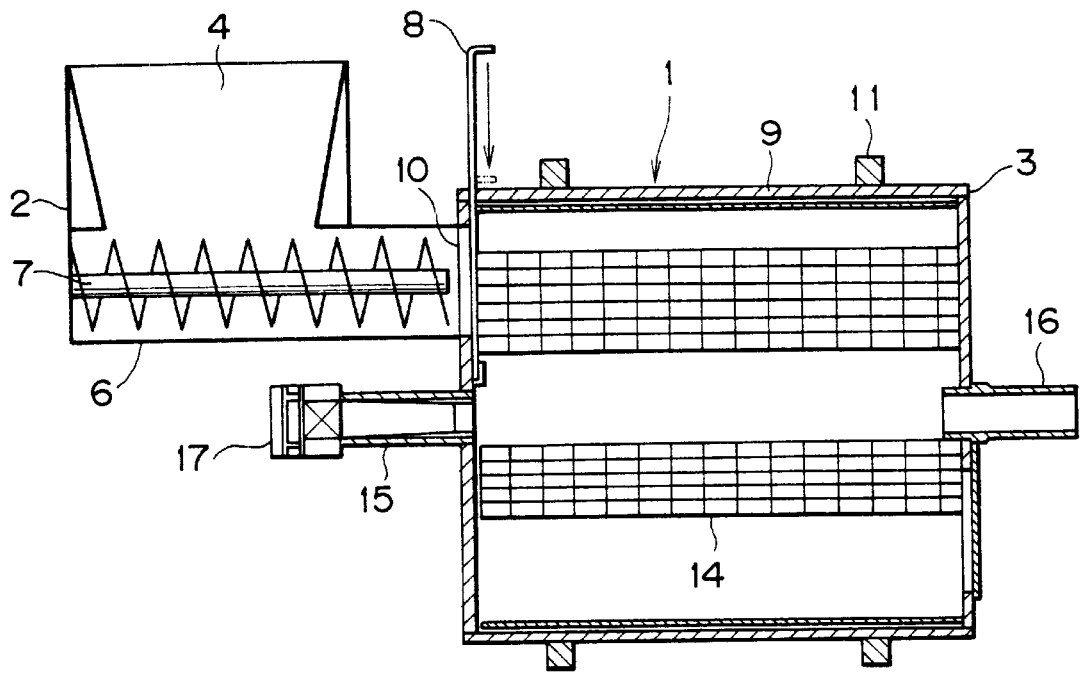
FIG. 2A is a side view schematically showing the configuration of an apparatus for water-content control and granulation of a treating object material for use in the method according to the present invention.
Figure 2B:
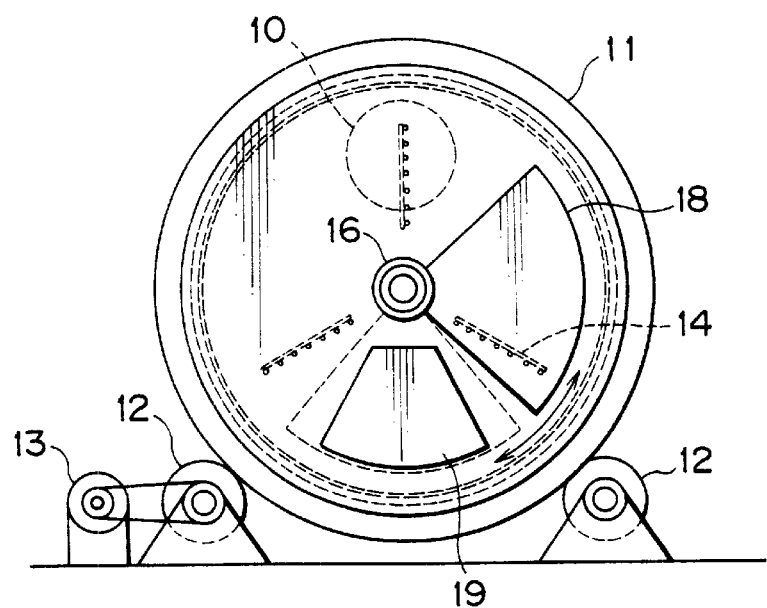
FIG. 2B is an end view showing the apparatus of FIG. 2A.

The apparatus 1 for water-content control and granulation as shown in FIGS. 2A and 2B comprises a control device 2 to control the water content of the treating object material consisting of cow dung or like organic waste material, and a granulating device 3 connected to the control device to granulate the controlled treating object material in sizes from 10 to 30 mm, for instance.

The control device 2 is composed of a hopper 4, into which the treating object material is fed together with a water-content control material, and a stirring delivery device 6 connected to the lower part of the hopper to deliver the fed materials to the granulating device 3 with stirring for mixing together. Reference numeral 7 denotes a stirring delivery portion rotationally driven for delivery of the treating object material with stirring.

The granulating device 3 is equipped with a cylindrical rotary drum 9 communicating with a discharge opening of the stirring delivery device 6 as being switched over to an opened or closed state through a feed opening 10 with a slide shutter 8, a rolling ring 11 mounted to the circumference of the front and rear ends of the drum 9, and two front and rear support rollers 12 making rolling contact with the rolling rings 11 to support the rotary drum 9 rotationally. Reference numeral 13 denotes a motor for driving rotationally at least one of the support rollers 12 to rotate the drum 9 at a speed of rotation of about 2 to 3 rpm.

Grating-shaped screens 14 of a width as about half as the radius of the drum are mounted to the inside of the drum 9 in radial arrangement at intervals of 120 degrees about the drum axis as extending over the approximately total length of the inside of the drum. A certain clearance is provided between at least the outer end of each screen and the inside of the drum.

The screens 14 are to catch the fed treating object material for pulverization of a mass of the treating object material in the course of being dropped after having been lifted up with the rotation of the drum 9, and also to allow the pieces of the treating object material to pass downwards. The pieces of the treating object material dropped toward the bottom of the inner surface of the drum are granulated finally into a nodular-shape (a dumpling-shape) of a diameter of about 10 to 30 mm in sequence through the rotation of the drum, with repeating upward and downward movements. Once rolling of the pieces of the treating object material along the inner surface of the drum is started, the pieces of the treating object material continue to be rolled on the lower part of the inside of the drum 9 without the upward and downward movements. With this process, the nodular-shaped pieces are gradually transformed into a ball shape, resulting in a completion of granulation. The size of a diameter of each granule is determined according to the size of meshes of the screen 14.

Air supply and exhaust ducts 15, 16 formed of longitudinally projecting pipe-shaped ducts are projecting from the center positions of the front and rear walls of the drum 9. A fan 17 with a heater is mounted to the air supply duct 15 to permit the supply of warm air at temperatures of 60 to 70° C. into the drum 9. With the fan 17, the treating object material in the drum is heated, while air is exhausted through the exhaust duct 16.

A large quantity of oxygen is mixed into the treating object material in the above repetitive dropping and pulverizing process, while the supply of warm air as described above permits evaporation of a certain quantity of water and granulation with flexible strength enough to hold the shape of granules. In addition to the above, the supply of warm air may produce heating effects on acceleration of primary fermentation in the subsequent process. A shorter period of time is required for initial heating, which will be described later, by feeding the treating object material into the fermentation apparatus 31 in a short period of time after granulation.

A take-out opening 19 opened or closed by a pivotally slide-type shutter 18 is provided in the rear wall of the drum 9 and is structured to permit the water content-controlled, granulated treating object material to be taken out to the outside easily. The above treating object material may be taken out more easily by tilting the drum 9 down rearwards or installing the drum 9 in a tilted state.

Figure 3A:
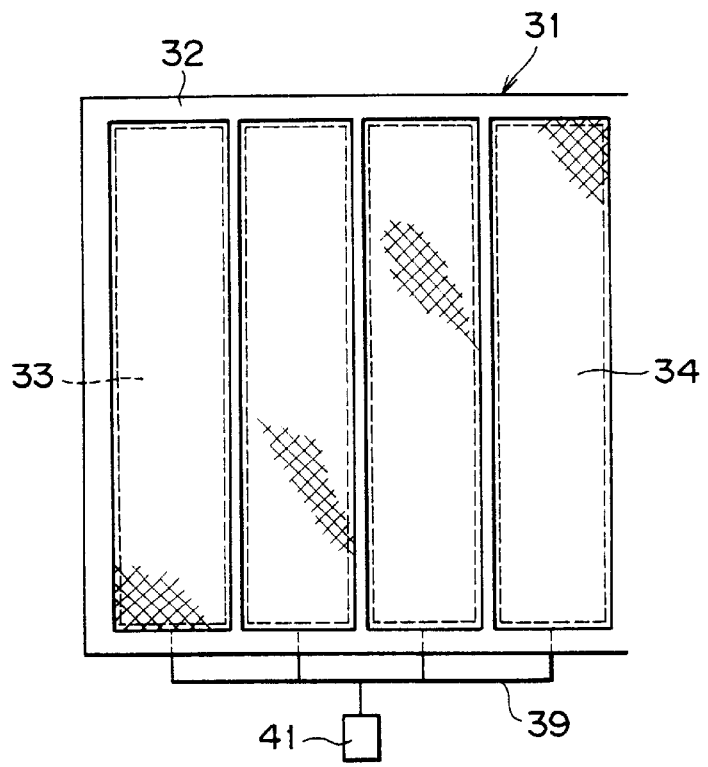
FIG. 3A is an enlarged sectional view showing an apparatus for fermentation according to the present invention.
Figure 3B:
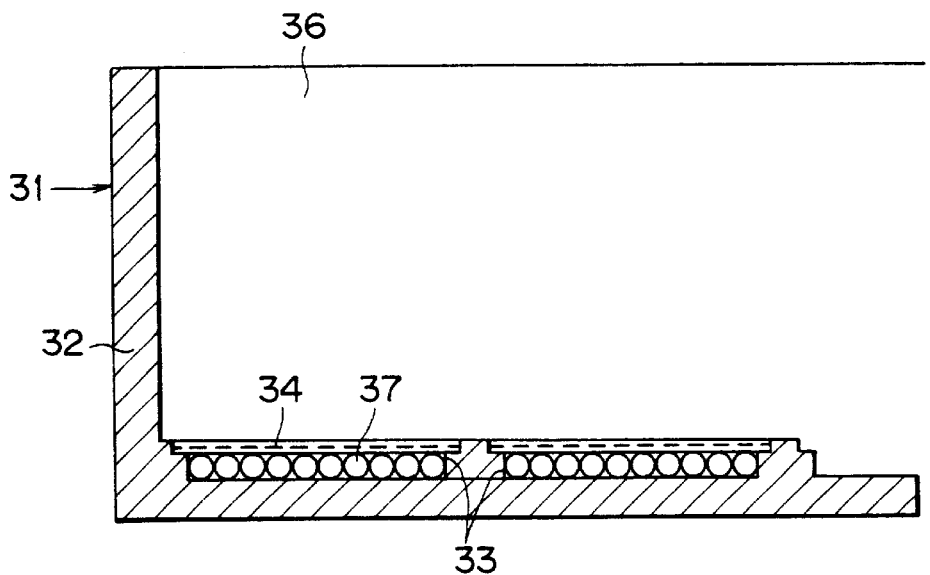
FIG. 3B is a plan view showing the whole of the apparatus of FIG. 3A.

The fermentation apparatus 31 shown in FIGS. 3A and 3B is of a box-shaped or cylindrical structure formed of a higher heat-insulating waterproof material (concrete or the like). The fermentation apparatus 31 in this embodiment, for instance, has a box-shaped fermentor 32 of about 1,800 mm in height, 4,800 mm in depth and about 250 to 300 mm in wall thickness. Concave-shaped air supply chambers 33 of 1,000 mm in width and about 100 mm in depth are provided on the inner bottom of the fermentor 32 in lengthwise parallel arrangement in a depth direction. A clearance between the air supply chambers 33 is set to be about 200 mm, and the size of its lateral width is determined at will according to the size of a space.

A plate-shaped ventilation floor 34 is mounted in a fit state to the upper surface of the air supply chamber 33 to place the granulated treating object material thereon. Thus, the air supply chamber and the fermentation chamber 36 above the air supply chamber are partitioned from each other through the ventilation floor as permitting ventilation between both the chambers. The ventilation floor 34 is formed of a waterproof net, punching metal, expand metal or the like. In this case, the ventilation floor needs to have a structure of ensuring well-ventilation between the air supply chamber 33 and the fermentation chamber 36 through meshes or holes, which are sized too small to permit the passage of the granules of the treating object material.

Pipes 37 having outside walls with a section of about 100 mm in diameter are housed in the air supply chambers 33 in longitudinally parallel arrangement. Each pipe 37 has a certain heat-insulating, waterproof outer wall of a mesh-shaped or well-ventilated structure having a large number of small holes. The pipes 37 arranged as described above constitutes a dispersing device for supplying warm air into the fermentation chamber 36 in a uniformly dispersed state as will be described later.

An air supply tube 39 is connected to one end of each pipe 37. A warm air supply device 41 composed of a fan with a heater or the like is connected to the base end side of the air supply tube 39. Thus, warm air at temperatures of about 60 to 70° C. is supplied from the warm air supply device to the bottom of the fermentation chamber 36 through the pipes 37, the air supply chambers 33 and the ventilation floors 34 in the uniformly dispersed state.

The warm air supplied to the fermentation chamber 36 is sent upwards uniformly through the spaces between the surfaces of the adjacent granules of the treating object material accommodated in the fermentation chamber 36 with heating the above treating object material. The warm air continues to be supplied until the treating object material is heated up to a temperature of about 42° C. enough to permit spontaneous fermentation.

A description will now be given of a method for treatment of cow dung using the above apparatus with reference to FIG. 1. Cow dung normally having 80 to 90% of water content and already fermented dry cow dung (having about 35% of water content, for instance) as the water-content control material are fed into the control device 2 through the hopper 4 and are then mixed together in the control device for uniform mixing of the treating object material and control of a percentage of water content (about 55 to 70%) in the whole material. The lower the percentage of water content, in the water-content control material, the less water-content control material is required. A description will now be given of the quantity of already fermented cow dung added in the case of mixing the already fermented cow dung having 35% of water content, into raw cow dung having 80% of water content. The quantity of already fermented cow dung added is determined according to a 1:1.25 mixing ratio of 1 of the raw cow dung to 1.25 of the already fermented cow dung in the case of needing to set the percentage of water content in the whole cow dung to 55%. On the other hand, a 1:0.22 mixing ratio of 1 of the raw cow dung to 0.22 of the already fermented cow dung is required for the case of setting the percentage of water content in the whole cow dung to 72%.

After a certain quantity of the treating object material delivered from the control device 2 is fed into the drum 9, the rotation of the drum 9 is started to granulate the treating object material in a nodular-shape of 10 to 30 mm in diameter with heating as described above. The upper limit of the percentage of water content for granulation is about 72%. On the other hand, when the percentage of water content exceeds the above upper limit, granulation itself is made difficult.

The granules of the treating object material are taken out through the take-out opening in sequence by opening the shutter 18 after the stop of the drum rotation, and are then fed into the fermentation chamber 36 of the fermentation apparatus 31 as shown in FIG. 3 as being accommodated therein in layers. Since the granules of the treating object material take a nodular-shape in this stage, spaces communicating with one another in vertical and lateral directions are formed between the surfaces of the adjacent nodular-shaped granules of the treating object material.

After a predetermined quantity of treating object material is accommodated in the fermentation apparatus 31, the warm air supply device 41 is actuated to supply warm air at temperatures of about 60 to 70° C. into the fermentor 32 through the air supply chamber 41. The warm air is supplied to heat the whole treating object material substantially uniformly for 2 to 3 hours until the temperature of the treating object material accommodated in the fermentation apparatus reaches about 42° C. enough to permit spontaneous fermentation.

With the heating process described above, the treating object material starts its spontaneous fermentation by its own heat, and the temperature of the treating object material rapidly rises up to the peak of about 70 to 74° C. in a period of about 19 to 24 hours. With the process of keeping up fermentation for about 48 hours (two days) since then, the temperature of the treating object material drops to about 55 to 60° C. The heating time and the temperature rise curve vary according to the percentage of water content in the treating object material. For instance, the longer heating time is required, and the temperature rises more gently the higher the percentage of water content is.

With the above fermentation, the primary fermentation (aerobic fermentation) is considered to be substantially finished, and it is ascertained that the volume of the treating object material is reduced to about $2/3$, the percentage of water content is lowered by about 5%, and besides, the cow dung is deodorized. Incidentally, since the offensive odor itself of the cow dung has been almost eliminated whenever the peak temperature has been reached, there is no fear that the cow dung emits an offensive odor to the external environment even though taken out to the air.

The treating object material deodorized as described above is not regarded as the waste material any more, and as a result, may be used as a fertilizer. Thus, it becomes possible to carry out treatment based on secondary fermentation in another place or facility after taking out the above deodorized treating object material to the outside for carrying back to a farm or the like.

A period of 2 to 3 months is required for the secondary fermentation as anaerobic fermentation of the primarily fermented treating object material, if allowed to stand as it is since the end of primary fermentation. On the other hand, the period taken for the secondary fermentation may be remarkably reduced, when the fermentor 32 is shut off from the outside to carry out heating without the flow of air into the fermentation chamber 36 or its ventilation therethrough after the completion of the above primary fermentation (preferably, after the primarily fermented treating object material is allowed to stand for about 24 hours, if possible).

It was ascertained that the secondary fermentation might be finished in a period of about 10 to 14 days by the process of keeping up heating at temperatures of about 70° C. for 6 to 8 hours from a point of time of a drop of the temperature of the material down to about 40° C. since the end of primary fermentation.

Since the percentage of water content in the treating object material having finished the secondary fermentation is assumed to be 50 to 65%, the secondarily fermented material needs to be dried spontaneously or forcibly with a drier until its percentage of water content is reduced to about 35% for convenience in handling or packaging. Then, a part of the resultant material is applied to the water-content control material, while the other is forwarded to the subsequent process for packaging, shipping or the like.

A description will now be given of the results of experiments on fermentation of cow dung having 66% of water content and that having 71% of water content using the method described above. Incidentally, there are shown the results of each experiment made without carrying out heating for the duration of secondary fermentation, and the following temperature data is based on the measurement in a period of 10 days since the start of experiments.

| (Common experiment conditions) | |
|---|---|
| 1. Place: | Matue City, Shimane Prefecture, Japan |
| 2. Treating object material: | Cow dung (Holstein) |
| Water-content control material: | Already fermented dry cow dung (35% of water content) |

| | |
|---|---|
| 3. Fermentor | Material: Foamed styrol container<br>Inner size: 320 mm in width ×<br>460 mm in depth × 870 mm in height<br>Height of air supply chamber:<br>70 mm |
| 4: Thermometer: | Thermocouple thermometer |
| 5: Warm air | Temperature: 70° C.<br>Feed rate: 0.02 m³/kg/H (feed rate per hour for 1 kg of cow dung) |

[Experiment 1]

(Experiment conditions)

| | |
|---|---|
| 1: Date: | 6th to 16th, October, 1999 |
| 2: Outside air temperature:<br>Minimum: 10.5 to 21.1°C | Maximum: 19.0 to 30.1°C |
| 3: Percentage of water content: | 66% |

Figure 4A:
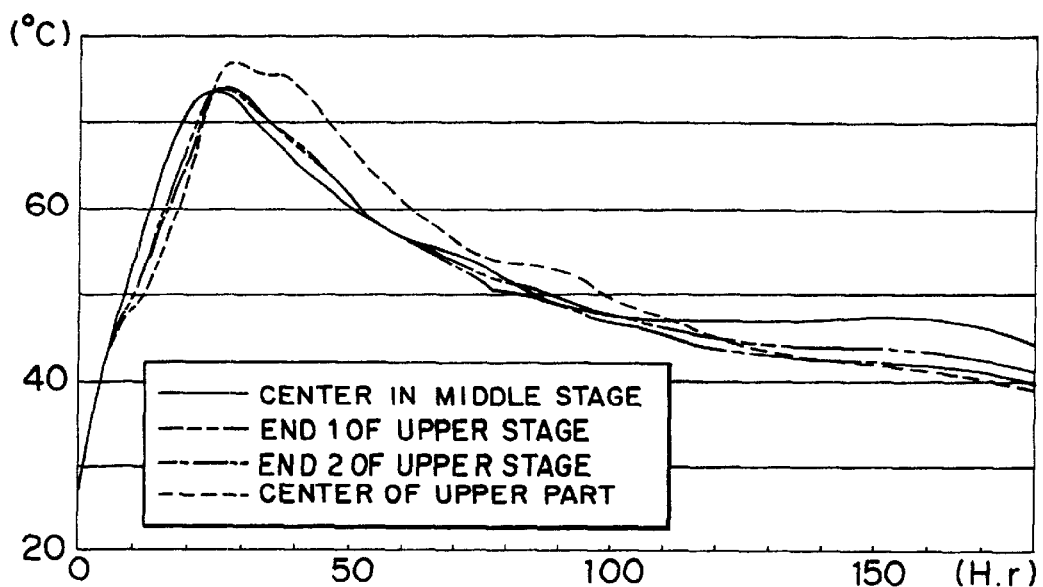
FIGS. 4A and 4B are graphic representations of curves of the temperature change of a treating object material as the results of experiments 1, 2 based on the method according to the present invention respectively.

FIG. 4A shows a temperature change in the above experiment. As shown in FIG. 4, the temperature rises up to about 35° C. in a period of about 2.5 hours since the start of initial heating. Thereafter, while spontaneous fermentation continues to take place, the whole material temperature rapidly rises to its peak of about 74° C. in a period of about 24 hours. After reaching the above peak, the temperature drops in the shape of a relatively gentle gradient curve to about 55° C. in a period of three days since the start of heating, and it is deemed that the primary fermentation is substantially finished in this stage.

When a cover is put on the upper part of the fermentor for stopping the ventilation of air in the fermentor after the end of primary fermentation, anaerobic secondary fermentation is started after the lapse of about 24 hours from the end of primary fermentation. Thereafter, the material temperature drops in the shape of a gentle curve. In this case, when the material is allowed to stand as it is, the material temperature drops to the outside air temperature, and as a result, a period of about 2 to 3 months is needed to finish the secondary fermentation. From a different experiment, it is verified that the secondary fermentation may be finished in a period of 10 to 14 days by the process of keeping up heating at about 70° C. for a predetermined period of time (7 to 8 hours) from a point of time of a drop of the material temperature to about 40° C. as described above.

Incidentally, the measurement of temperatures shown in FIGS. 4A and 4B was made by inserting a thermometer into points in the center of the middle stage (480 mm below the upper end of the fermentor), at the ends 1, 2 of the upper stage (350 mm below the same) and in the center of the upper part (the upper stage) (200 mm below the same).

[Experiment 2]

(Experiment conditions)

| | |
|---|---|
| 1. Date: | 7th to 17th, October, 1999 |
| 2. Outside air temperature: | Maximum: 17.7 to 30.1° C.<br>Minimum: 8.3 to 21.1° C. |
| 3. Percentage of water content: | 71% |

Figure 4B:
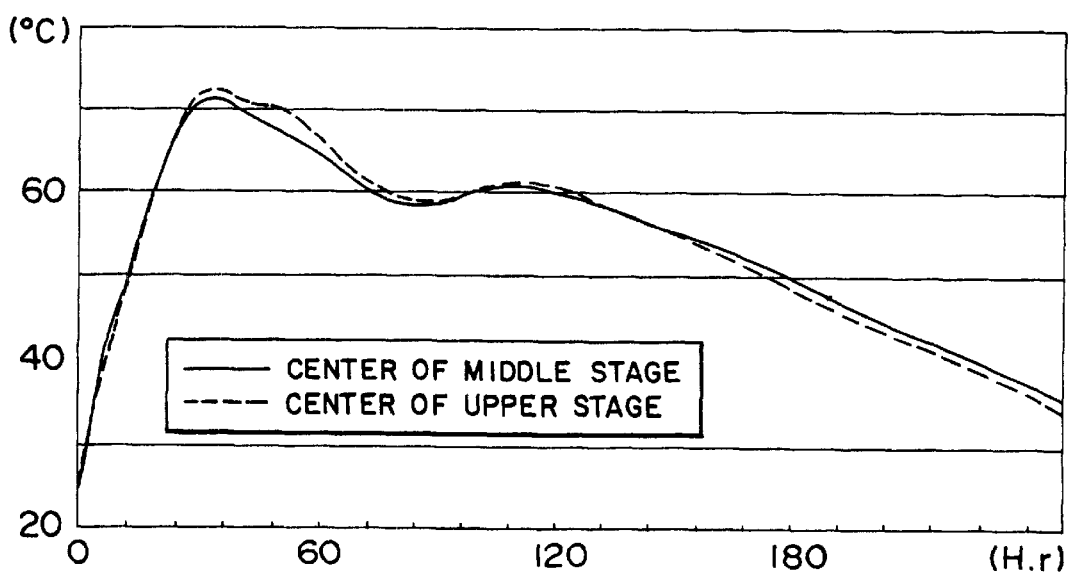

FIG. 4B shows the results of the above experiment. In this experiment, the temperature measurement was made at points in the center of the middle stage (480 mm below the upper end of the fermentor) and in the center of the upper stage (210 mm below the same). Although it takes about 3.5 hours for initial heating in this experiment, the temperature reaches its peak (about 72° C.) in a period of about 24 hours since the start of initial heating substantially similarly to the experiment 1. The results of the experiment 2 are substantially similar to those of the experiment 1 in that it takes about 3 days from the start of a drop of the temperature till a change of the temperature drop in the shape of a gentle gradient curve (till the end of primary fermentation), and the secondary fermentation is started gently after the lapse of about 24 hours from the end of primary fermentation. It is supposed that a difference in temperature curve between the results of the experiments 1, 2 is based on a difference in percentage of water content between the treating object materials used in the experiments 1, 2.

A germination test on Chinese cabbage seeds was made using a fertilizer consisting of 100% of the material fermented as described above and another fertilizer consisting of a mixture of the fermented material and river sand in equal quantities. From the results of the above test, normal germination is observed after the lapse of 4 to 5 days in either case. It is also ascertained that the above fermented material may be applied to the fertilizer as it is.

Incidentally, while the above description has been given of the embodiment in case of the treatment of Holstein dung, applications for the treating object material include the whole range of organic waste materials such as sewage sludge, raw sewage sludge and kitchen or restaurant garbage, other than the cattle dung. Incidentally, it is preferable that the garbage or like some organic waste materials containing large solid matters in a treating object material needs to be pulverized into pieces of a certain size in advance. Further, simply by changing the mixing ratio of the water-content control material according to the percentage of water content therein, the percentage of water content in the already fermented cow dung fed as the water-content control material may be more or less than 35%.

What is claimed is:

1. In a mechanism having a fermentation chamber for fermenting a treating object material including an organic waste material accommodated in a fermentor, and a warm air supply chamber provided at a lower part of said fermentation chamber, an apparatus for fermentation of an organic waste material, comprising a dispersing device on the inside of said warm air supply chamber for supplying warm air toward the bottom of said fermentation chamber in a uniformly dispersed state, wherein said dispersing device is structured such that a large number of pipes having mesh-shaped outer walls, to ensure ventilation, are installed in or inserted into the warm air supply chamber in grating-shaped or panel-shaped combination, and warm air is supplied to said pipes.

* * * * *